United States Patent
Verbanic et al.

(10) Patent No.: US 7,002,278 B2
(45) Date of Patent: Feb. 21, 2006

(54) SUPPORT STRUCTURE FOR HIGH-VOLTAGE CONDUCTORS

(75) Inventors: Michael Verbanic, Winter Park, FL (US); Franklin T. Emery, Fort Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 124 days.

(21) Appl. No.: 10/661,687

(22) Filed: Sep. 12, 2003

(65) Prior Publication Data
US 2005/0057115 A1  Mar. 17, 2005

(51) Int. Cl.
*H02K 1/24* (2006.01)
(52) U.S. Cl. .......................... 310/260; 310/91
(58) Field of Classification Search ............. 310/91, 310/260, 270
See application file for complete search history.

(56) References Cited

U.S. PATENT DOCUMENTS

| | | | |
|---|---|---|---|
| 2,677,067 A | | 4/1954 | Johnson et al. |
| 2,980,757 A | * | 4/1961 | Coggeshall et al. .... 174/138 E |
| 5,373,211 A | | 12/1994 | Ramirez-Coronel et al. |
| 6,856,057 B1 | * | 2/2005 | Kobayashi et al. ........... 310/71 |
| 2003/0173841 A1 | | 9/2003 | Kobayashi et al. |

FOREIGN PATENT DOCUMENTS

| | | |
|---|---|---|
| GB | 956724 | 4/1964 |
| JP | 2003 134753 | 5/2003 |
| WO | WO 98/20598 | 5/1998 |

* cited by examiner

*Primary Examiner*—Darren Schuberg
*Assistant Examiner*—Nguyen Hanh

(57) ABSTRACT

A support structure (20) is provided for supporting and spacing apart high-voltage electrical conductors (12) in an electric machine. An exemplary support structure (20) includes an improved spacer block (32,33) that is configured to reduce electrical flashover, in the form of creep, between adjacent high voltage conductors, without necessarily increasing the width of the spacer block. The improved spacer block (32,33) includes a main body (33) and a protruding portion (32), which elongates the creepage path (30) between adjacent high-voltage conductors to greater than the width of the spacer block (32,33).

12 Claims, 4 Drawing Sheets

PARAMETERS FOR CALCULATION OF BREAKDOWN OF GASES

| GAS | Mole Wt | a | b | c |
|---|---|---|---|---|
| He | 4 | 0.878 | 0.900 | 4.31 |
| A | 39.95 | 0.856 | 0.904 | 13.3 |
| H2 | 2.02 | 0.780 | 0.740 | 35.0 |
| CO2 | 44.01 | 0.866 | 0.833 | 66.7 |
| AIR | 28.8 | 0.899 | 0.878 | 75.4 |
| N2 | 28.01 | 0.854 | 0.829 | 76.3 |
| CO | 28.01 | 0.840 | 0.842 | 78.5 |
| SF6 | 146.1 | 0.995 | 1.010 | 214 |

US 7,002,278 B2

SUPPORT STRUCTURE FOR HIGH-VOLTAGE CONDUCTORS

FIELD OF THE INVENTION

The present invention relates generally to support structures for use in electric machines, and more particularly to support structures configured to reduce electrical creep between high-voltage conductors.

BACKGROUND

Large, industrial electric machines operate at extremely high energy levels. Industrial turbine generators, for example, may operate at voltages as high as 30,000 volts and currents as high as 15,000 amps. As a result, industrial electric machines utilize large, specially-configured conductors known as high-voltage conductors.

Two examples of high-voltage conductors that are commonly implemented in turbine generators are stator windings and parallel rings. Stator windings are located in the stator core of a generator. Stator windings conduct the alternating current and voltage induced by a generator's field windings. Parallel rings are located near the ends of a generator. Parallel rings provide an electrical path from the stator windings of a generator to the main leads. Parallel rings conduct the same high-level alternating currents and voltages that are conducted by stator windings.

High-voltage conductors, like stator windings and parallel rings, are mechanically supported within an electric machine by specially-configured support structures. The support structures often include rectangular spacer blocks for mechanically separating adjacent high-voltage conductors. These rectangular spacer blocks are generally positioned periodically between adjacent high-voltage conductors in order to maintain a fixed distance between them. This improves the mechanical performance of an electric machine by providing rigid support for and separation of high-voltage conductors. However, conventional-rectangular spacer blocks also impair the electrical performance of an electric machine by increasing the chance of creep between the high-voltage conductors.

When high-voltage conductors are separated by a conventional-rectangular spacer block, they become susceptible to electrical flashover in the form of creep. To address this problem, high-voltage conductors can be further insulated or spaced farther apart. But, adding additional insulation to high-voltage conductor reduces their ability to dissipate heat. Moreover, spacing the conductors further apart causes an undesirable increase in the size of the electric machine.

SUMMARY OF THE INVENTION

With the foregoing in mind, methods and systems consistent with the present invention provide improved support structures for high-voltage electrical conductors. An exemplary support structure includes an improved spacer block that is configured to reduce creep between adjacent conductors, without necessarily increasing the width of the spacer block or the overall size of the electric machine.

In one aspect, the above objects, features, and advantages are provided by a spacer block that includes a main body constructed of an insulating material. The main body has a principal width W for separating a first and second high-voltage electrical conductor by a distance substantially equal to the principle width W. The spacer block has an exposed surface along the principal width, extending from the first high-voltage conductor to the second high-voltage conductor. The spacer block includes a protruding portion that protrudes from the main body and elongates the exposed surface to form an elongated creepage path between the first and second high-voltage electrical conductor. The creepage path is greater in length than the principal width W of the spacer block.

In another aspect, the above objects, features, and advantages are provided by a support structure that comprises a brace constructed of an electrical-insulation material and configured to be rigidly mounted to an electric machine to mechanically support a first and second high-voltage conductor. The brace has a support surface on which the first and second high-voltage conductor are positioned. The support structure also includes a spacer block that has a principal width W and is constructed of an electrical-insulation material. The spacer block is configured to be mounted between the first and second high-voltage conductors to space the first and second high-voltage conductor apart by a distance of substantially W. The spacer block includes a protruding portion that comprises a substantially rectangular protrusion that protrudes from the spacer block to form an elongated surface over the spacer block between the first and second high-voltage conductor. A creepage path is formed over the substantially shortest path over the elongated surface from the first high-voltage conductor to the second high-voltage conductor. The creepage path has a length L that is greater than the principal width W of the spacer block 13.

In another aspect, the above objects, features, and advantages are provided by a method of mechanically supporting and spacing apart a first and second high-voltage conductor. The method comprises the steps of positioning an insulating spacer block between the first and second high-voltage conductor to space apart the first and second high-voltage conductor by a distance W substantially equal to a principal width of the spacer block. The spacer block comprises a main body having a substantially rectangular main body and at least one protruding portion for increasing a creepage path between the first and second high-voltage conductor to a length L that is greater than the principal width W of the spacer block.

BRIEF DESCRIPTION OF THE DRAWINGS

The invention is explained by way of example with reference to the following drawings.

DETAILED DESCRIPTION

Electrical flashover between high-voltage conductors can occur in the form of strike or creep. Strike is an electrical discharge through an open-gas gap between conductors. Creep is an electrical discharge over an insulated surface, such as a spacer block between conductors. For a conventional rectangular-spacer block of a given size, creep generally occurs at a lower voltage than strike. Conventional rectangular-spacer blocks tend to reduce the electrical performance of an electric machine by introducing a creepage path between adjacent conductors. In other words, if a first pair of conductors is separated by an open gas gap of width W and a second pair of conductors is separated by a conventional-rectangular spacer block of width W, electrical flashover will occur at a lower voltage for the conductors separated by the spacer block.

Figure 1:
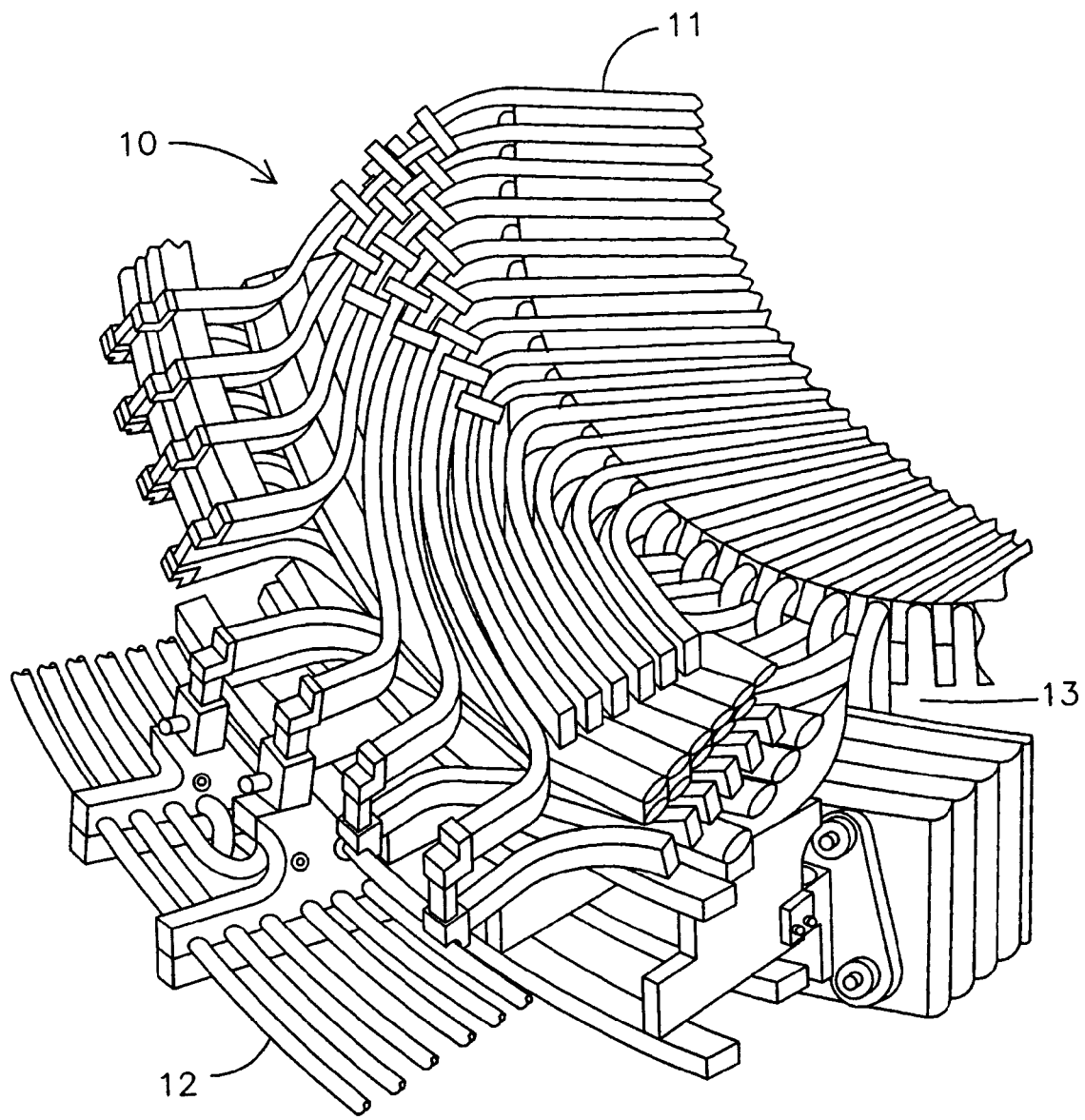
FIG. 1 illustrates an exemplary electric machine in which methods and apparatuses consistent with the present invention may be applied.

FIG. 1 illustrates an end region 10 of a large turbine generator, which is one example of a context in which methods and apparatuses consistent with the present invention may be utilized. The end region 10 includes various high-voltage conductors for conducting electrical energy. The high-voltage conductors illustrated include stator windings 11 and parallel rings 12. The stator windings 11 are disposed within a generally cylindrical stator core. The stator windings generally also include (not illustrated) a plurality of phase zones each of which constitute a plurality of coil sides. The coil sides in each phase, except those constituting the terminal coil side portions, are serially connected at each axial end of the stator core. The unconnected ends of the terminal coil sides constitute terminals, which are radially separated from the axis of the stator core by discrete radial distances at a first axial end of the stator core.

At the axial end of the stator core, the stator windings 11 are electrically connected to high-voltage conductors referred to as parallel rings 12. The parallel rings 12 comprise large copper bus bars that encircle the end of the generator.

Figures 2, 3:
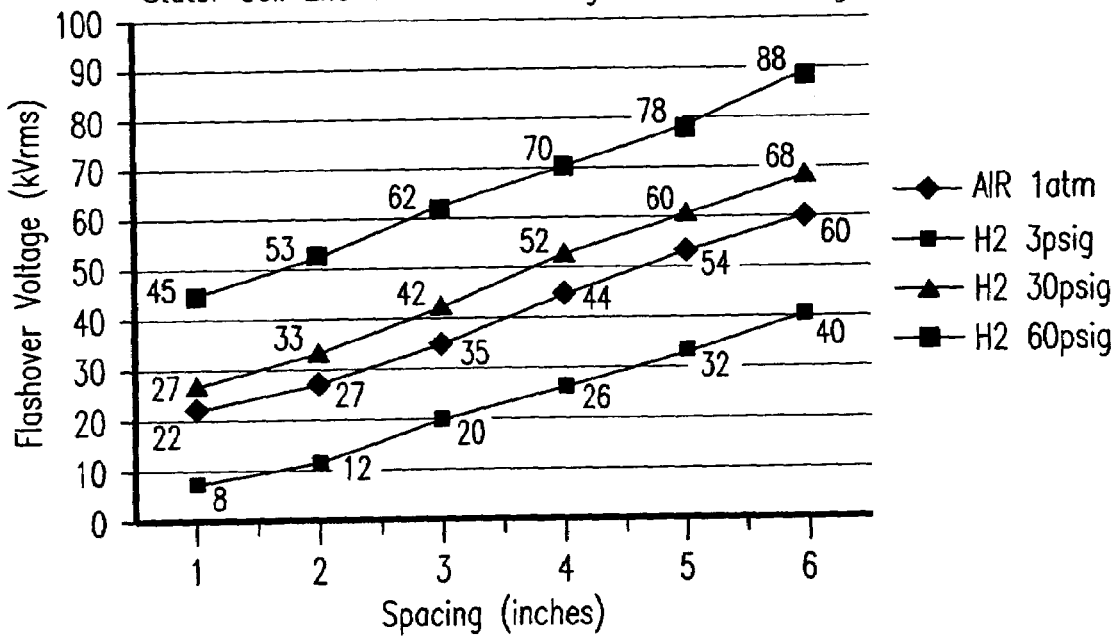
FIG. 2 illustrates exemplary parameters for the calculation of voltage breakdown in gas.
FIG. 3 illustrates exemplary test data for voltage breakdown in hydrogen and air.

During the operation of a generator, the voltage levels in stator windings 11 and parallel rings 12 are the phase-to-phase voltage of the generator, which may be as high as 30,000 volts. As a result, the stator windings 11 and parallel rings 12 may be susceptible to electrical flashover in the form of strike or creep. The strike voltage for a uniform gas gap may be calculated using the formula $$V=0.707(P/RT)^a \cdot d^b \cdot c \text{ kVrms}$$

where V is the strike voltage in kilovolts rms (kVrms), P is the gas pressure in atmospheres (atm), T is the absolute temperature in K, R is the gas constant 0.08205 liters atm/mole K, d is the gap width in millimeters, and a, b and c are gas constants. FIG. 2 illustrates gas constants for use in this formula for calculating electrical strike in several exemplary gases. Hydrogen ($H_2$) and air are particularly common gases in electric machinery because of their desirable heat-transfer characteristics. FIG. 3 illustrates actual test data obtained for strike in hydrogen and air at various gap sizes.

As mentioned above, creep is of particular concern in electric machines that utilize conventional-rectangular spacer blocks. Conventional-rectangular spacer blocks used to mechanically separate high-voltage conductors actually reduce the flashover voltage for a given conductor separation. In fact, conventional-rectangular-spacer blocks may reduce the flashover voltage for a given conductor separation by as much as 80%. A conventional approach to this problem is to increase the width of the spacer block. However, this adds significant, unwanted size to the associated electric machine.

Figure 4:
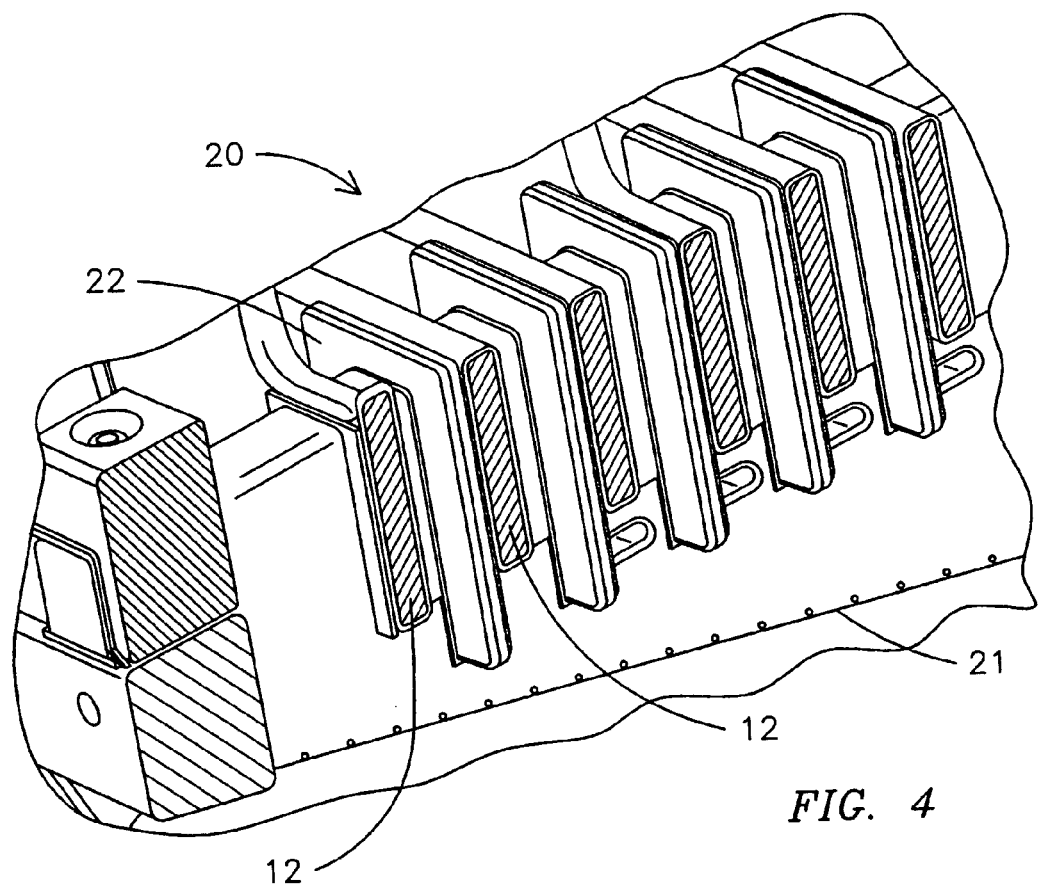
FIG. 4 illustrates a support structure consistent with an exemplary embodiment of the present invention.

FIGS. 4 and 5A–D illustrate an improved-spacer block consistent with the present invention for increasing the flashover voltage between high-voltage conductors without necessarily increasing the width of the spacer block. FIG. 4 illustrates an exemplary support structure 20 consistent with the present invention for supporting high-voltage conductors, such as those illustrated in FIG. 1. The support structure 20 includes a brace 21. The brace 21 may be constructed of any rigid insulating material. Examples of such materials include green-glass-epoxy resin or a glass-epoxy rigid laminate material. The support structure 20 is configured to be fixedly attached to an electric machine, such as an electrical generator. One or more high-voltage conductors 12 may rest on or may be fixedly attached to the brace 21.

The support structure 20 is configured for use with one or more improved spacer blocks 22. FIGS. 5A–D illustrate an exemplary embodiment of an improved spacer block consistent with the present invention. The improved spacer block may be constructed of a rigid insulating material, such as green-glass-epoxy resin or a glass-epoxy rigid laminate material. The improved spacer block 22 is configured to be positioned between adjacent high-voltage conductors. The improved spacer block 22 has a principal width W for separating the adjacent conductors by a distance substantially equal to W. The improved spacer block 22 has a creepage path 30 of length L, which is defined by the path from one conductor to an adjacent conductor over the surface of the improved spacer block 22. The length L of the creepage path 30 is greater than the width W of the improved spacer block. The increase in the length L of the creepage path 30 may be achieved, for example, by forming the improved-spacer block 22 to have a profile with a varying height. The exemplary profile illustrated in FIGS. 5A-D has a protruding portion 32 comprising a rectangular step up region formed at the center of the block, with a height H above the main body 33 and a width smaller than the width W of the main body 33. This exemplary profile results in a creepage path having a length L that is equal to W+2H.

Figure 5A:
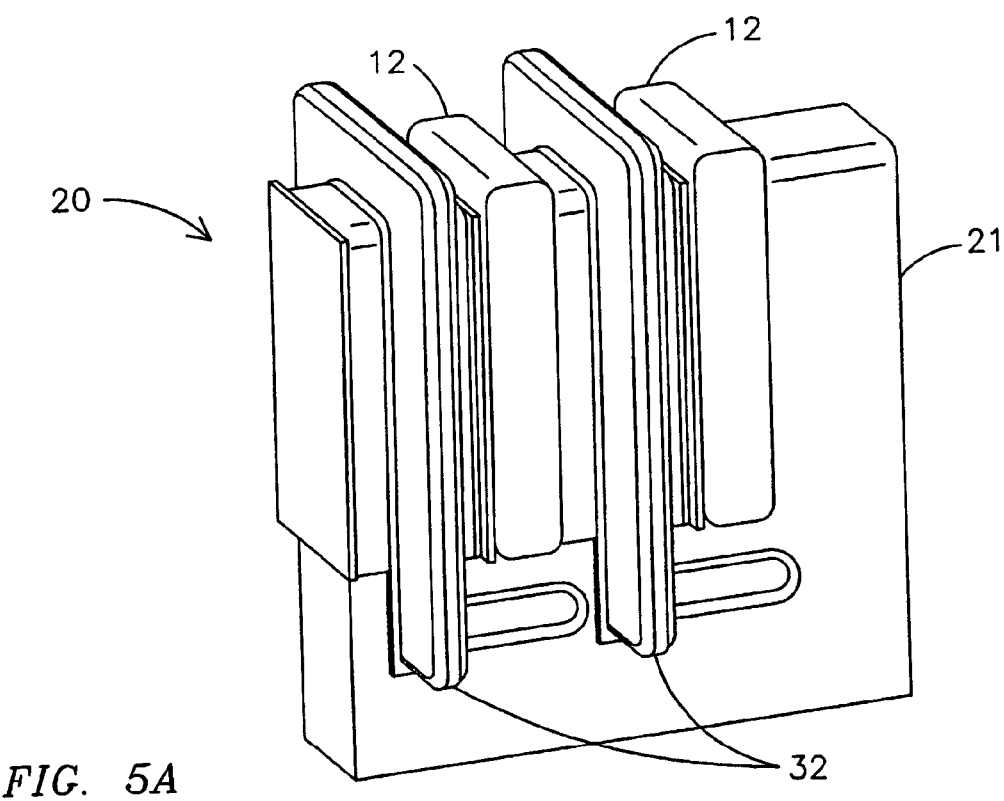
FIGS. 5A–D illustrate an exemplary spacer block consistent with the present invention.
Figure 5B:
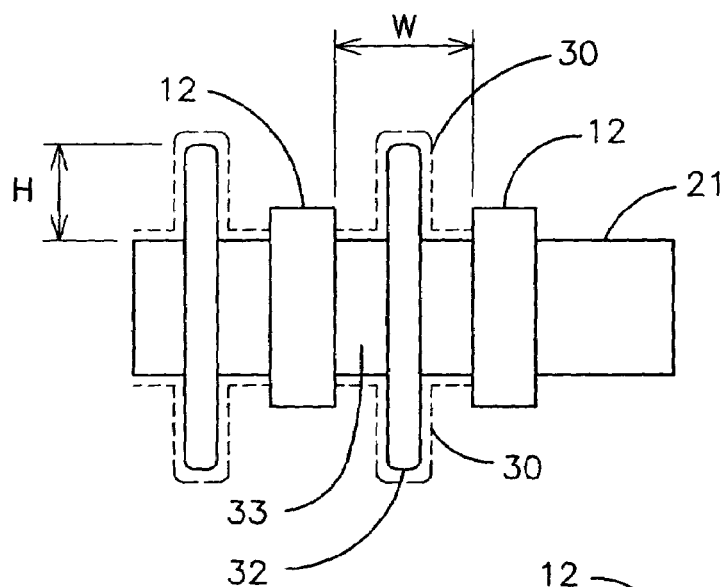
Figure 5C:
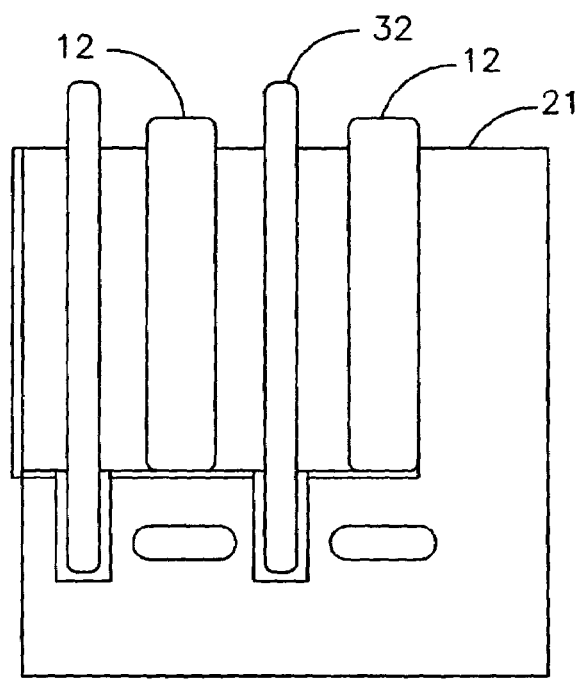
Figure 5D:
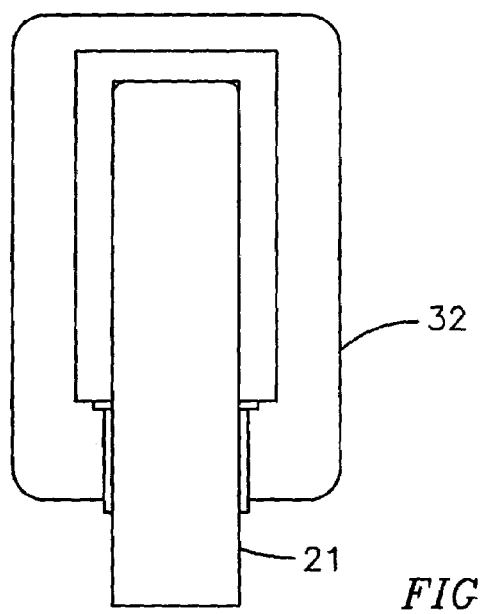

Many other profiles are consistent with the present invention, including profiles with multiple protruding portions having the same or different heights. Smooth bell-shaped or triangle-shaped profiles are other examples. In addition, the protruding portion may protrude from only three sides of the spacer block's main body as illustrated in FIG. 5A or may protrude from all four sides of the main body if accommodating modifications are made to the brace 21. With the profile illustrated in FIGS. 4 and 5A–D and a creepage path equal to approximately 5 times the width W of the spacer block, the creepage flashover voltage level is raised by approximately 17%. In the exemplary embodiment, edges and corners of the main body 33 and protruding portion 32 may also be smoothed to increase the corona inception voltage at the edges and corners of the spacer block.

Test Results

Tests were conducted on the exemplary embodiment illustrated in FIGS. 4 and 5A–D. The tests compared the flashover voltage between two flat, insulated conductors when the conductors were separated by (i) an air gap, (ii) a conventional rectangular spacer block and (iii) the improved spacer block. The conductors were hand taped with a nominal single-wall insulation thickness of 0.11 inches. Flashover measurements were first made with the conductors separated by a 2 inch air gap. In that configuration, flashover occurred between 60 kVrms and 65 kVrms in the form of strike. Next, flashover measurements were made with the conductors separated by a conventional-rectangular spacer block constructed of G11 green glass having a width and creepage-path length of 2 inches. In that configuration, flashover occurred at 52 kVrms in the form of creep. Flashover measurements were then made with the conductors separated by the improved spacer block illustrated in FIGS. 5A–5D with a width of 2 inches, a height of 3.5 inches and a creepage-path length of 9 inches. In that configuration, flashover occurred at 60 kVrms in the form of creep. The exemplary embodiment of the improved-spacer block provided an effective increase in creep voltage on the order of 17 percent.

The present invention has been described with reference to the accompanying drawings that illustrate preferred embodiments of the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. For example, although the exemplary embodiment illustrated has a protruding portion with a rectangular profile, many other profiles are consistent with the present invention. Various creepage path lengths are also consistent with the present invention. The scope of the invention should be determined based upon the appended claims and their legal equivalents, rather than the specific embodiments described above.

What is claimed is:

1. A spacer block for positioning between a first and second high-voltage conductor in an electric machine, said spacer block comprising:
    a main body comprising a substantially rectangular block constructed of
    an insulating material, said main body having a principal width W for separating said first and second high-voltage electrical conductor by a distance of substantially W;
    an exposed surface along said principal width of said main body, extending from said first high-voltage conductor to said second high-voltage conductor; and
    a protruding portion protruding from said main body and elongating said exposed surface to form a creepage path between said first and second high voltage electrical conductor that is greater in length than said principal width W of said spacer block along the entire portion of said exposed surface.

2. The spacer block of claim 1 wherein said protruding portion protrudes substantially symmetrically from the middle plane of said principal width of said spacer block.

3. The spacer block of claim 2 wherein said protruding portion comprises a substantially rectangular step-up region.

4. The spacer block of claim 3 wherein said creepage path over said exposed surface comprises a path over a first substantially planar surface extending substantially perpendicularly from said first high-voltage conductor; a second substantially planar surface extending substantially perpendicularly from said first surface, a third substantially planar surface extending substantially perpendicularly from said second surface, a fourth substantially planar surface extending substantially perpendicularly from said third surface, and a fifth substantially planar surface extending substantially perpendicularly from said fourth surface.

5. The spacer block of claim 4 wherein said exposed surface includes corners and edges formed at intersections of said substantially planar surfaces and wherein said corners and edges are rounded to improve the electrical performance of said spacer block.

6. The spacer block of claim 5 wherein said exposed surface of said spacer block forms a creepage path approximately 5 times the principal width W of said spacer block.

7. A support structure for supporting at least a first and second high voltage conductor in an electric machine, said support structure comprising:
    a brace constructed of an electrical-insulation material and configured to be rigidly mounted to said electric machine to mechanically support said first and second high-voltage conductor, said brace having a support surface on which said first and second high-voltage conductor are positioned; and
    a spacer block having a principal width W and constructed of an electrical insulation material, wherein said spacer block is configured to be mounted between said first and second high-voltage conductors for spacing said first and second high-voltage conductor apart by a distance of substantially W;
    wherein said spacer block includes a protruding portion comprising a substantially rectangular protrusion protruding from said spacer block to form an elongated surface over the entire perimeter of said spacer block between said first and second high voltage conductor; and
    a creepage path formed over a substantially shortest path over said elongated surface from said first high-voltage conductor to said second high voltage conductor, said creepage path having a length L that is greater than the principal width W of said spacer block.

8. The support structure claim 7 wherein said protruding portion protrudes substantially symmetrically from the midpoint of said principal width of said spacer block.

9. The support structure of claim 7 wherein said protruding portion comprises a substantially rectangular step-up region.

10. The support structure of claim 9 wherein said creepage path over said elongate surface comprises a path over a first substantially planar surface extending substantially perpendicularly from said first high-voltage conductor; a second substantially planar surface extending substantially perpendicularly from said first surface, a third substantially planar surface extending substantially perpendicularly from said second surface, a fourth substantially planar surface extending substantially perpendicularly from said third surface, and a fifth substantially planar surface extending substantially perpendicularly from said fourth surface.

11. The support structure of claim 10 wherein said elongate surface includes corners and edges formed at intersections of said substantially planar surfaces and wherein said corners and edges are rounded to improve the electrical performance of said spacer block.

12. The support structure of claim 9 wherein said elongated surface of said spacer block forms a creepage path approximately 5 times the principal width W of said spacer block.

* * * * *